No. 668,809. Patented Feb. 26, 1901.
J. B. WARING.
DEVICE FOR CLEANING SHIPS.
(Application filed Jan. 30, 1900.)
(No Model.) 3 Sheets—Sheet 1.

WITNESSES:
F. Stallman
Geo. E. Cruse

INVENTOR
John B. Waring.
BY Edwin H. Brown
HIS ATTORNEY

No. 668,809. Patented Feb. 26, 1901.
J. B. WARING.
DEVICE FOR CLEANING SHIPS.
(Application filed Jan. 30, 1900.)

(No Model.) 3 Sheets—Sheet 2.

WITNESSES:

INVENTOR
John B. Waring.
BY
HIS ATTORNEY

No. 668,809. Patented Feb. 26, 1901.
J. B. WARING.
DEVICE FOR CLEANING SHIPS.
(Application filed Jan. 30, 1900.)
(No Model.) 3 Sheets—Sheet 3.
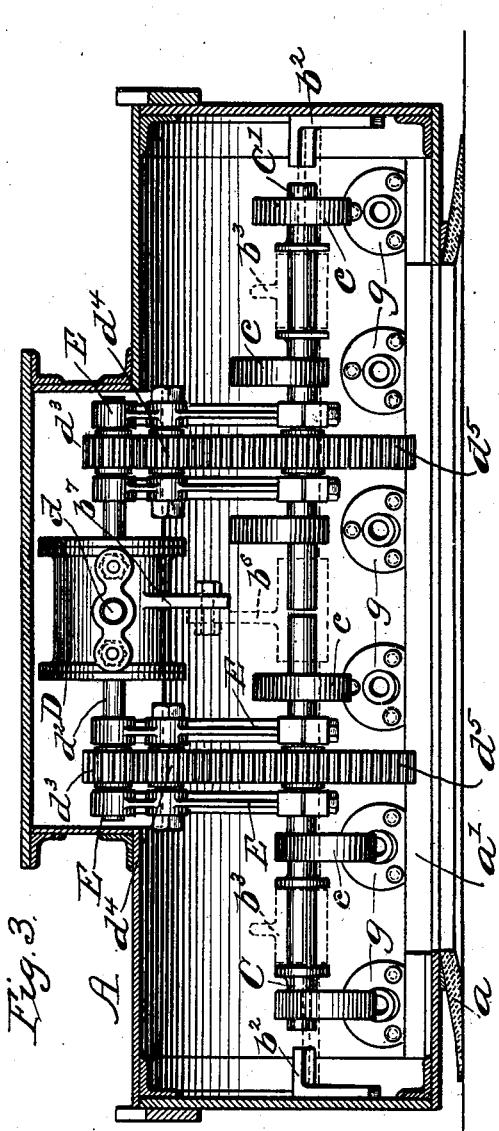
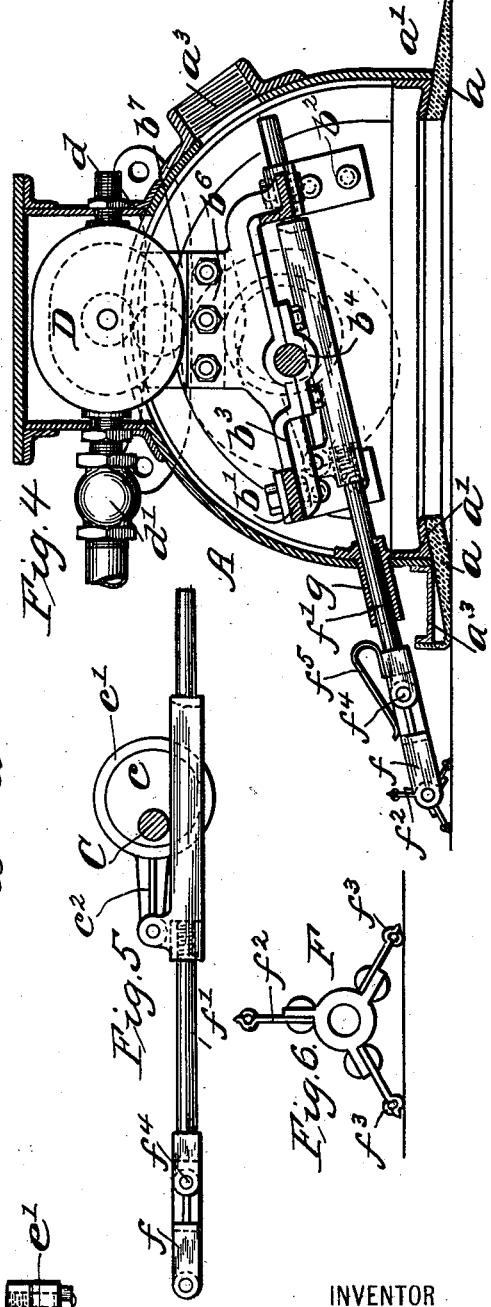
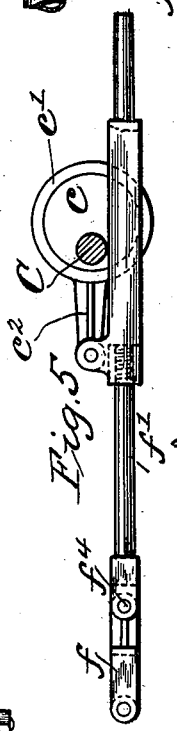
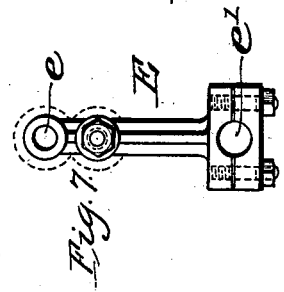
WITNESSES:
INVENTOR
John B. Waring.
BY
HIS ATTORNEY

UNITED STATES PATENT OFFICE.

JOHN B. WARING, OF NEWARK, NEW JERSEY, ASSIGNOR OF ONE-THIRD TO HUGH L. FOX, OF NEW YORK, N. Y.

DEVICE FOR CLEANING SHIPS.

SPECIFICATION forming part of Letters Patent No. 668,809, dated February 26, 1901.

Application filed January 30, 1900. Serial No. 3,267. (No model.)

*To all whom it may concern:*

Be it known that I, JOHN B. WARING, a citizen of the United States, residing at Newark, in the county of Essex and State of New Jersey, have invented certain new and useful Improvements in Devices for Cleaning Ships, of which the following is a specification.

My invention relates to devices for cleaning ships' hulls.

I will describe a device embodying my invention and then point out the novel features thereof in the claims.

Figure 1:
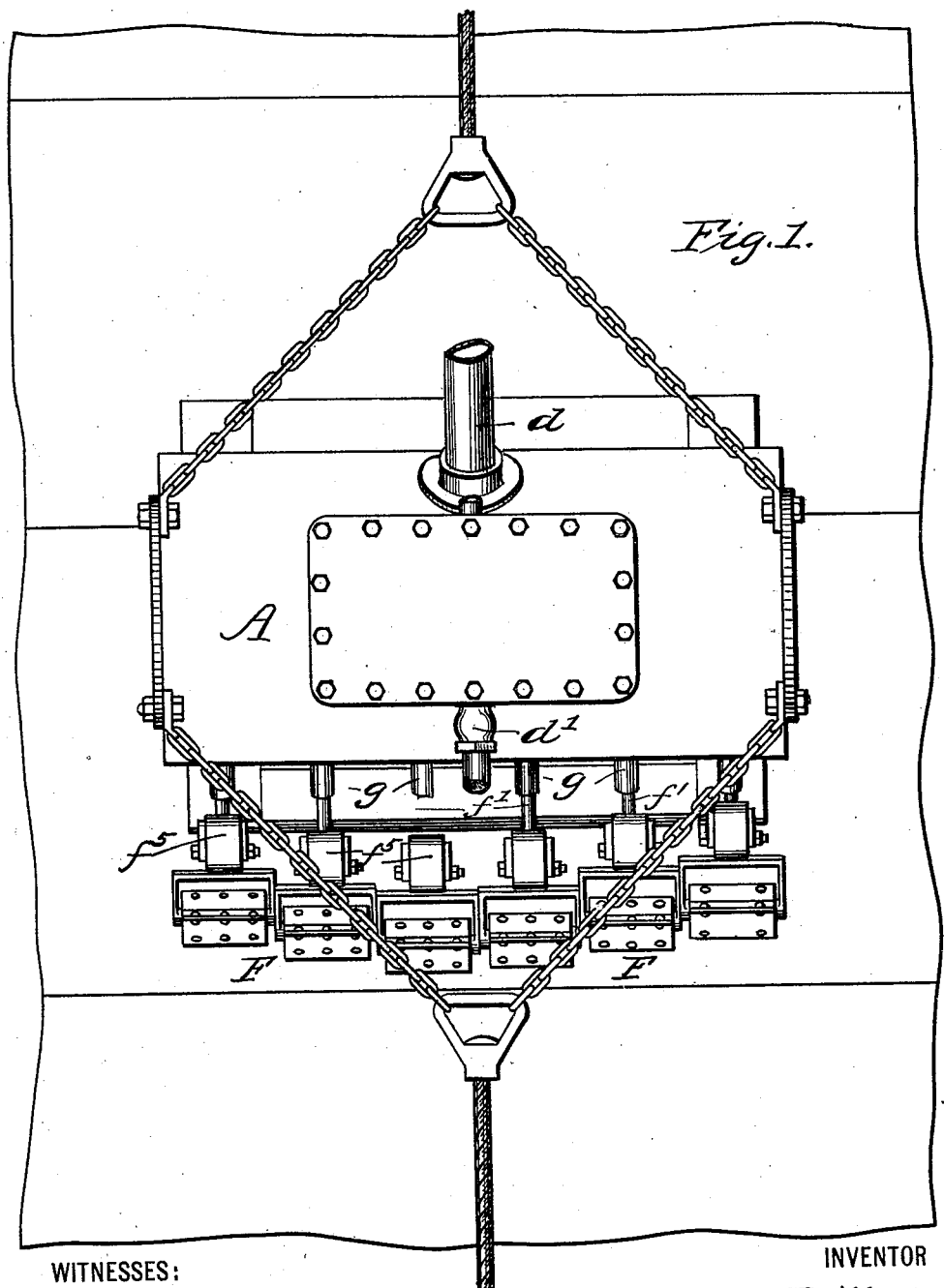
Figure 2:
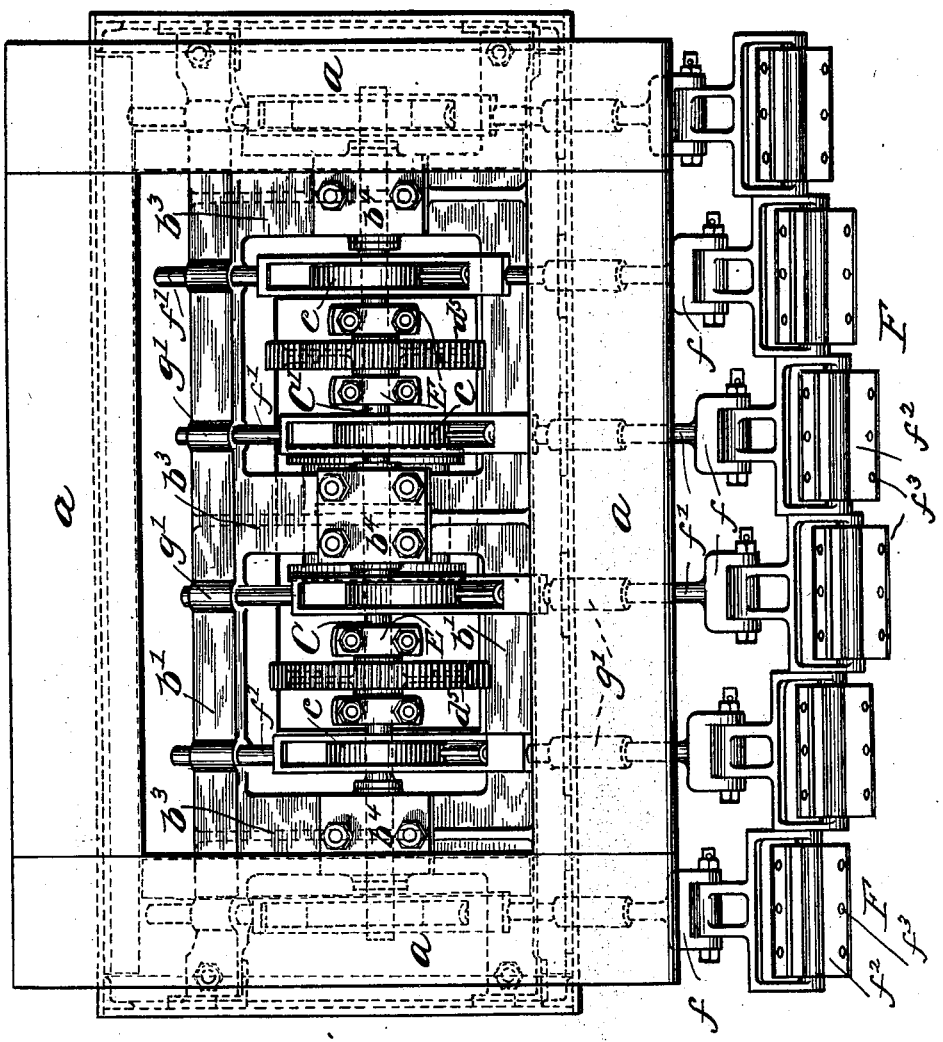

In the accompanying drawings, Figure 1 is a top view of a device for cleaning ships' hulls embodying my invention. Fig. 2 is a bottom view of the device shown in Fig. 1. Fig. 3 is a longitudinal sectional view. Fig. 4 is a transverse sectional view. Figs. 5, 6, and 7 are detail views of several parts comprised in the device.

Similar letters of reference designate corresponding parts in all of the views.

A represents a suitable casing, in which the motor and mechanism for operating the cleaning devices are contained. It is of any desired shape and may be made up in any desired manner. Preferably the casing will have an open bottom. The wall of this opening is provided with a flexible strip $a$, which extends beyond the edge thereof. This strip is preferably held in position by an angle-iron $a'$, which may form part of the casing. I have shown the strip as being wedge-shaped in cross-section, though the strip may have any other form in cross-section. One edge of the strip along one side of the casing is held up by a metallic piece $a^3$, carried by the casing. This is to prevent the strip from being bent or turned under when the device is moved over the vessel's hull. The purpose of this strip is to make a reasonably-tight joint between the casing and the vessel's hull when the device is being operated to clean the hull. Preferably the strip $a$ is so arranged on the casing about the opening thereof that the strip will travel over the cleaned surface of the vessel's hull. Air or water, or both, are exhausted from the casing by any suitable device through an opening in the casing, thus enabling the exterior pressure of air or water, or both, to hold the casing against the ship's hull.

Extending longitudinally of the casing A are two bars or other supports $b'$. They are held in the casing by bolts, which pass through them, and lugs $b^2$, that are secured to the casing. Extending between these two supports are a number of integral yokes $b^3$. The supports $b'$ and the yokes $b^3$ may constitute a frame to support the operating parts of the cleaning devices. The yokes $b^3$, in connection with cap-plates $b^4$, form bearings for two shafts C C'. The central yoke $b^3$ is provided with a flange $b^6$, to which a flange $b^7$ of an engine D is connected. The engine D is preferably a rotary one of any desired type and operated by either air, electricity, or steam. $d$ represents the inlet for the engine, and $d'$ the exhaust therefor. The shaft $d^2$ of the engine is provided at each of its ends with a pinion $d^3$. These pinions $d^3$ mesh with intermediate gears $d^4$, and the gears $d^4$ in turn mesh with driving-gears $d^5$, carried by the shafts C C'. The shafts of the gears $d^4$ are carried in standards E. (See Fig. 7.) These standards are held in position by the shafts C, C', and $d^2$, suitable openings $e$ and $e'$ being provided in the standards through which these shafts extend and loosely turn.

F represents cleaning-heads which are journaled in the forked ends $f$ of reciprocating rods $f'$. Each head consists of a plurality of scraping-blades $f^2$, radially arranged, and on each blade $f^2$ protuberances $f^3$ are provided, which are formed by cutting the blade and alternately bending outward the metal between the cuts. The purpose of these protuberances is to prevent the blades scraping off paint. The forked ends $f$ are hinged at $f^4$ to the ends of the rods $f'$, and they are held against the surface to be scraped by springs $f^5$.

The rods $f'$ are adapted to be reciprocated, and they are guided by sleeves $g$, secured to the casing A, and sleeves $g'$, carried by the support $b'$. As shown, each rod is made in sections in order that it can be conveniently assembled and placed in position in the device.

The rods $f'$ are reciprocated by means of eccentrics $c$, carried by the shafts C C'. The eccentrics are arranged on the shafts preferably in advance of one another in order that the rods $f$ and cleaning-heads may be moved successively. The connection between each eccentric and rod $f$ may be made by means of a strap $c'$, which surrounds the eccentric, and a link $c^2$, connecting the strap with the rod.

In operating the device it is lowered into the water and moved against the ship's hull and the exhausting device (not shown) set in operation to exhaust air and water from within the casing to permit the exterior water or air pressure to hold the casing against the hull. The rotary engine is then set in operation to reciprocate the cleaners, and as the cleaners are operated the device is moved over the hull. As a blade passes over the plates of the hull and engages with the edge of an overlapping plate it is turned on its bearing, and thus brings a new blade against the next plate.

Instead of cleaning-blades brushes may be substituted; also, instead of reciprocating the brushes or blades they may be rotated.

What I claim as my invention is—

1. In a device for cleaning ship-hulls, the combination of a casing, a shaft suitably journaled in said casing, a motor for rotating said shaft, a rod operated from said shaft, and a rotatable cleaning device having a hinged connection with one end of said rod.

2. In a device for cleaning ship-hulls, the combination of a casing, a shaft suitably journaled in said casing, a motor for rotating said shaft, a cleaning device, comprising a plurality of blades, rotatably mounted in the end of a rod, the said rod, and means for reciprocating said rod from said shaft.

3. In a device for cleaning ship-hulls, the combination of a casing having an open side which is against the hull and which casing is adapted to be held thereagainst by exterior pressure, means for providing a tight joint between said casing and the ship's hull, a motor and driving-shaft within said casing, and a plurality of cleaning devices without said casing which are operated from said shaft.

4. In a device for cleaning ship-hulls, the combination of a casing having an open side which is against the hull, and which casing is held against the hull by exterior pressure, means for providing a tight joint between said casing and the hull, a motor and operating-shaft within the casing, a rod or rods adapted to be reciprocated from said shaft, and a cleaning device or devices each having blades, rotatably mounted in said rod or rods.

5. In a device for cleaning the hull of a ship, the combination of a motor, and a plurality of rods adapted to be reciprocated by said motor and a cleaning-head rotatably mounted in each rod, said head comprising a plurality of radially-extending blades.

6. A cleaning-head comprising a plurality of radially-extending blades and protuberances on the ends of said blades.

7. The combination in a device for cleaning the hull of a ship, of a motor, rods operatively connected with said motor, and cleaning-heads, said heads being suitably journaled in the hinged and forked ends of said rods.

In testimony whereof I have signed my name to this specification in the presence of two subscribing witnesses.

JOHN B. WARING.

Witnesses:
  GEO. E. CRUSE,
  DONALD CAMPBELL.